No. 822,683. PATENTED JUNE 5, 1906.
S. O. MYERS.
MEASURING MACHINE.
APPLICATION FILED APR. 27, 1905.
5 SHEETS—SHEET 4.
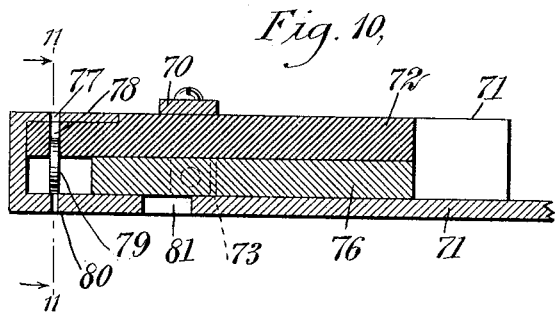
Fig. 7.
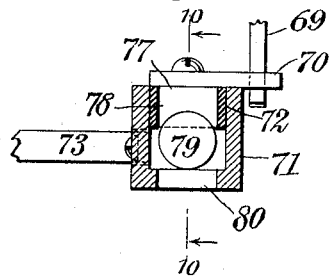
Fig. 10.
Fig. 11.
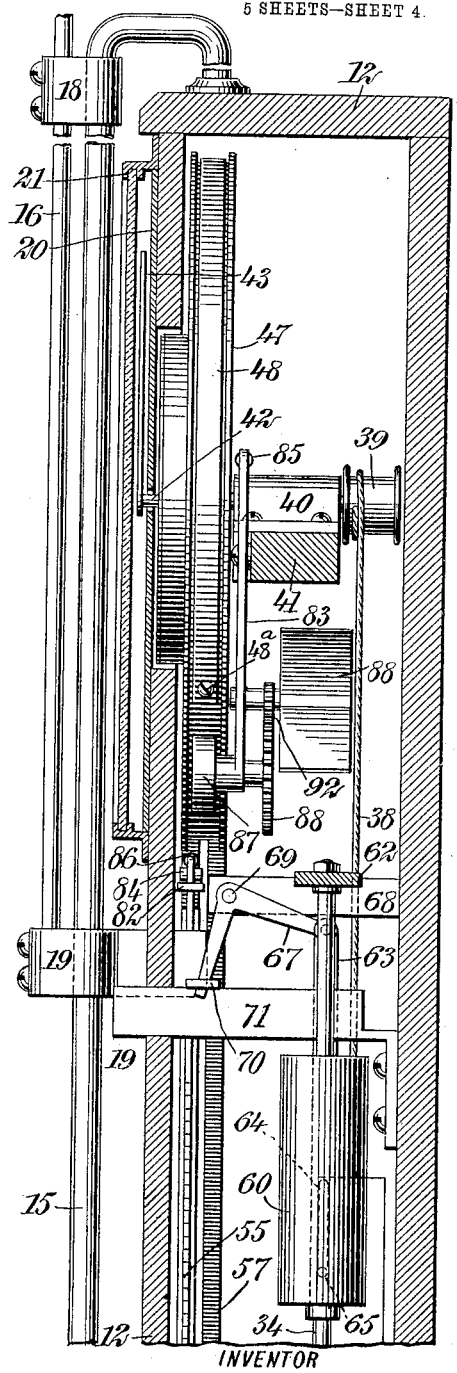
WITNESSES:
Edward Thorpe
Walton Harrison
INVENTOR
Stephen Oscar Myers
BY
ATTORNEYS No. 822,683.  
PATENTED JUNE 5, 1906.  
S. O. MYERS.  
MEASURING MACHINE.  
APPLICATION FILED APR. 27, 1905.  
5 SHEETS—SHEET 5.

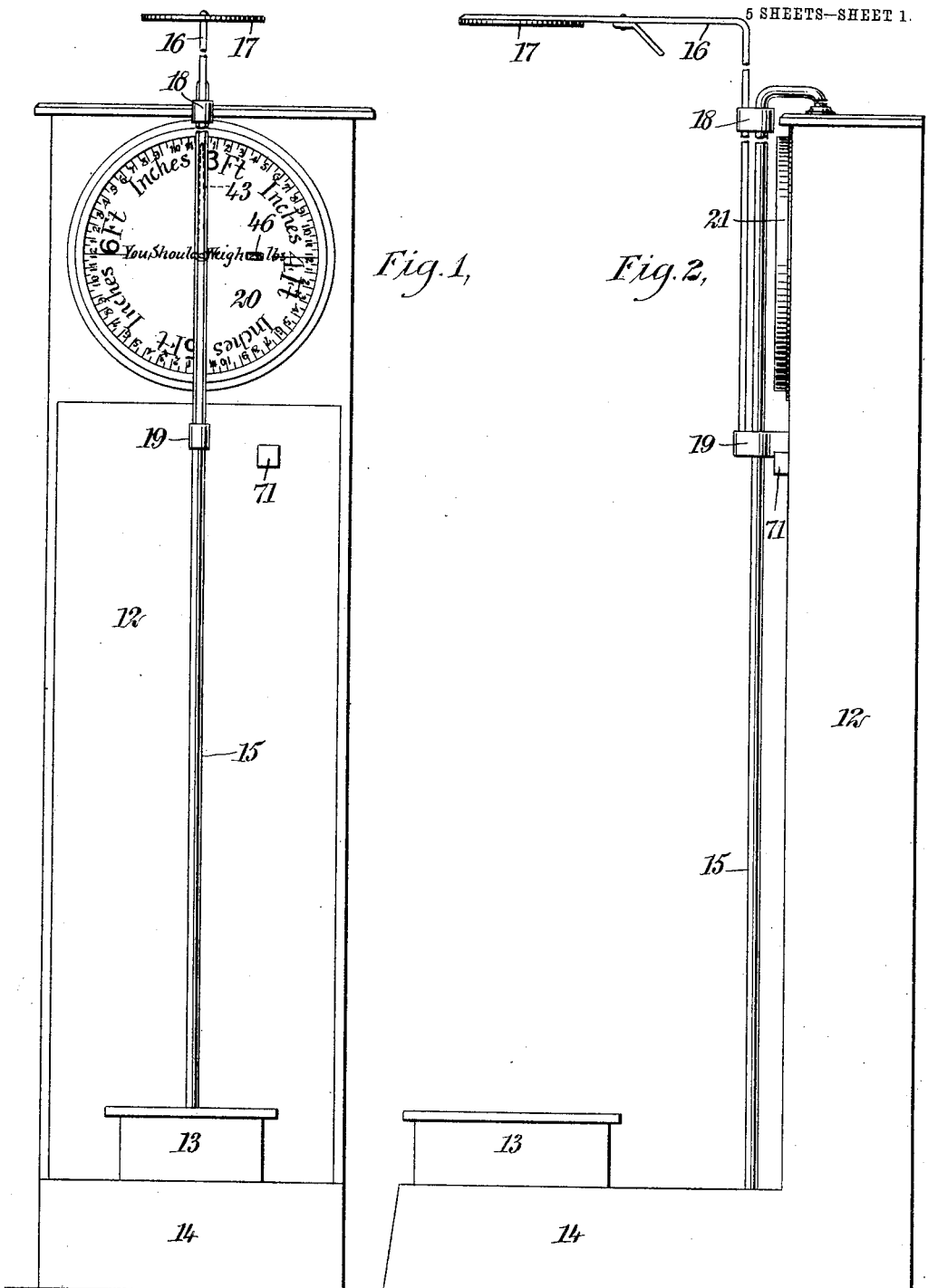

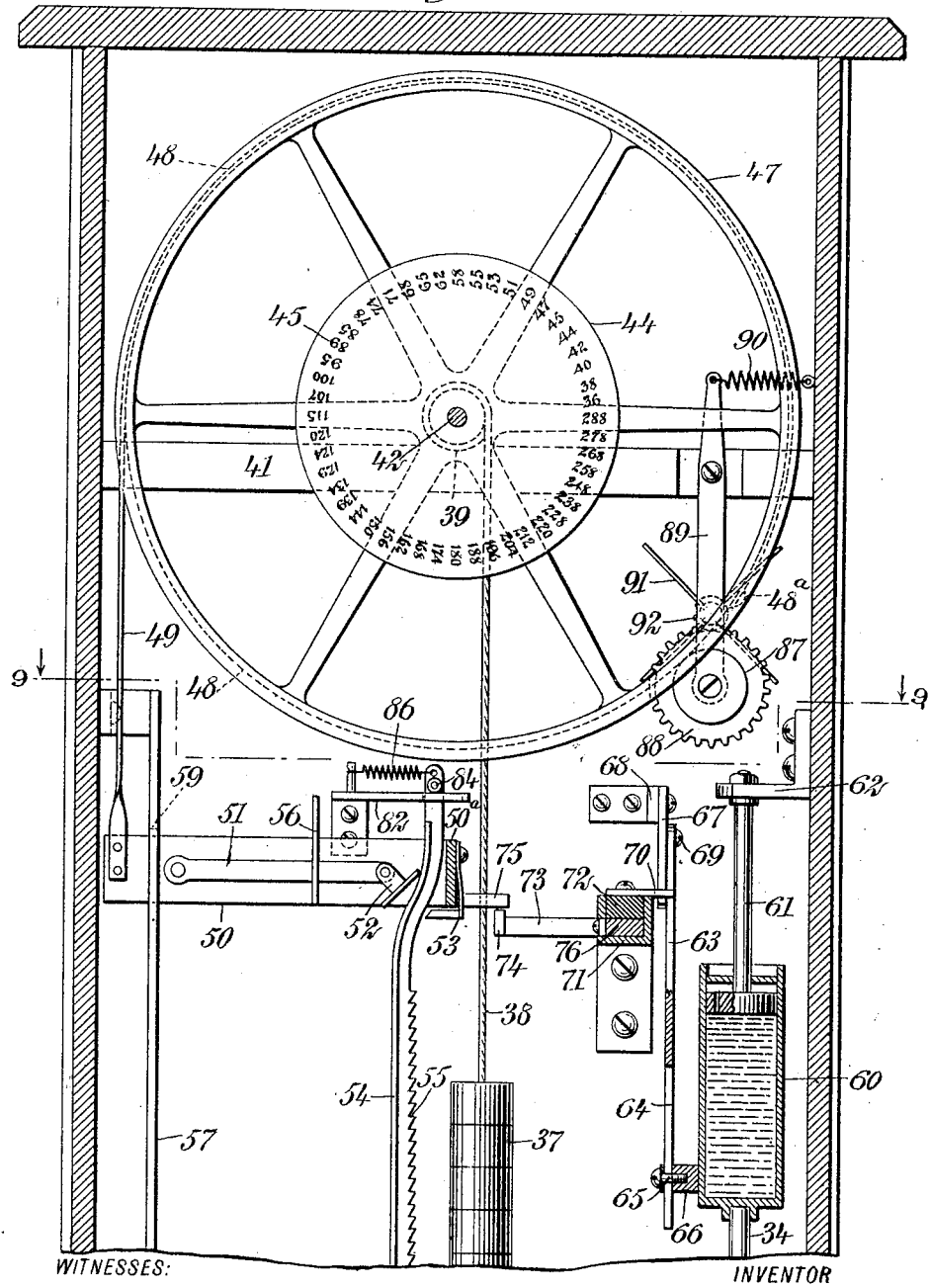

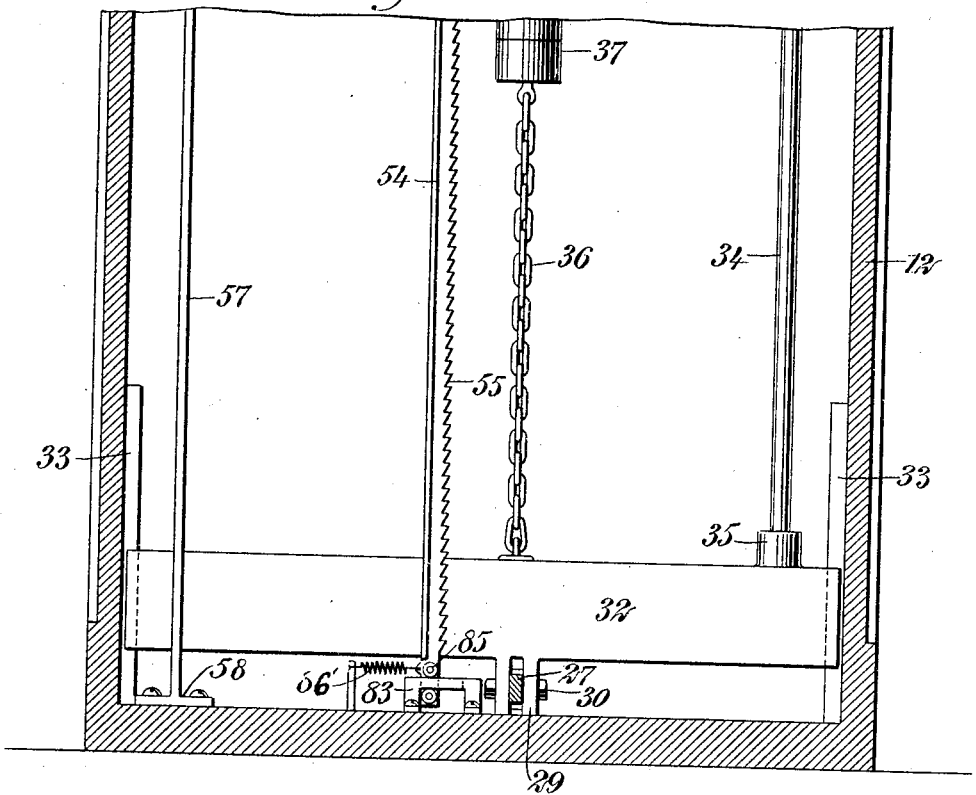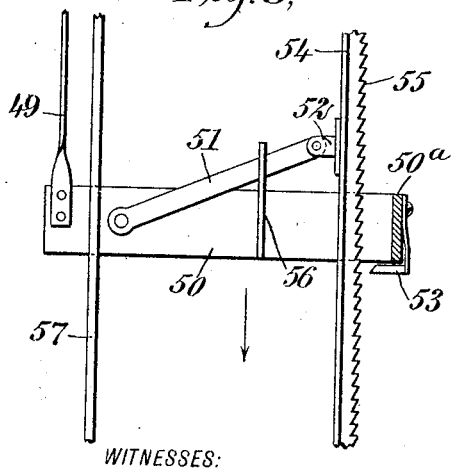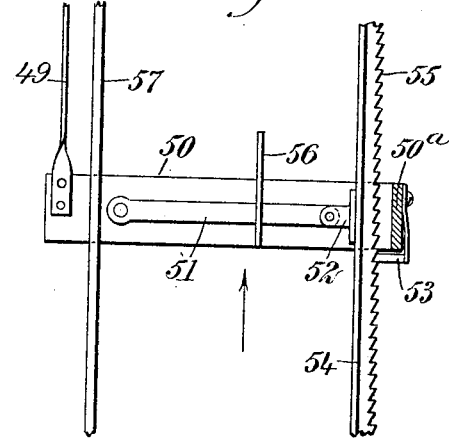

WITNESSES:  
Edward Thorpe.  
Walton Harrison.

INVENTOR  
Stephen Oscar Myers  
BY  
ATTORNEYS

UNITED STATES PATENT OFFICE.

STEPHEN OSCAR MYERS, OF MOUNT VERNON, NEW YORK.

MEASURING-MACHINE.

No. 822,683.  Specification of Letters Patent.  Patented June 5, 1906.

Application filed April 27, 1905. Serial No. 257,607.

*To all whom it may concern:*

Be it known that I, STEPHEN OSCAR MYERS, a citizen of the United States, and a resident of Mount Vernon, in the county of Westchester and State of New York, have invented a new and Improved Measuring-Machine, of which the following is a full, clear, and exact description.

My invention relates to measuring-machines, my more particular object being to provide a coin-controlled machine for measuring the heights and of indicating the normal weights of persons.

Reference is to be had to the accompanying drawings, forming a part of this specification, in which similar characters of reference indicate corresponding parts in all the figures.

Figure 8:
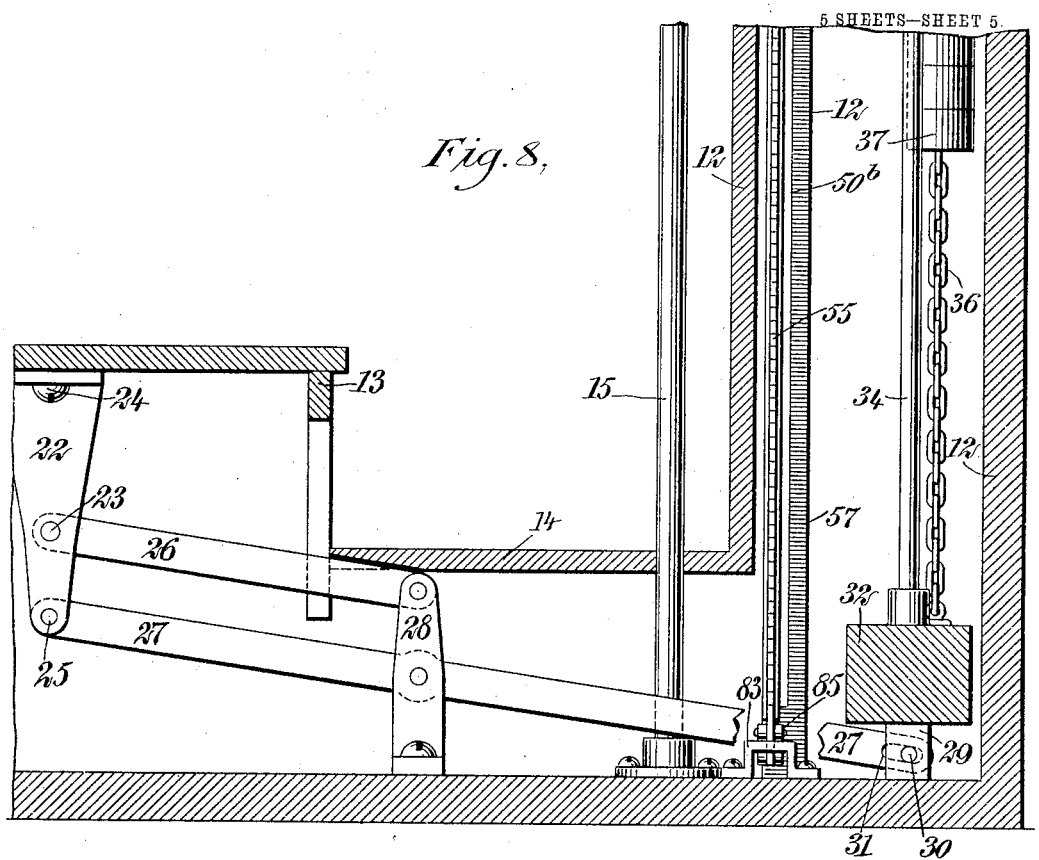
Figure 9:
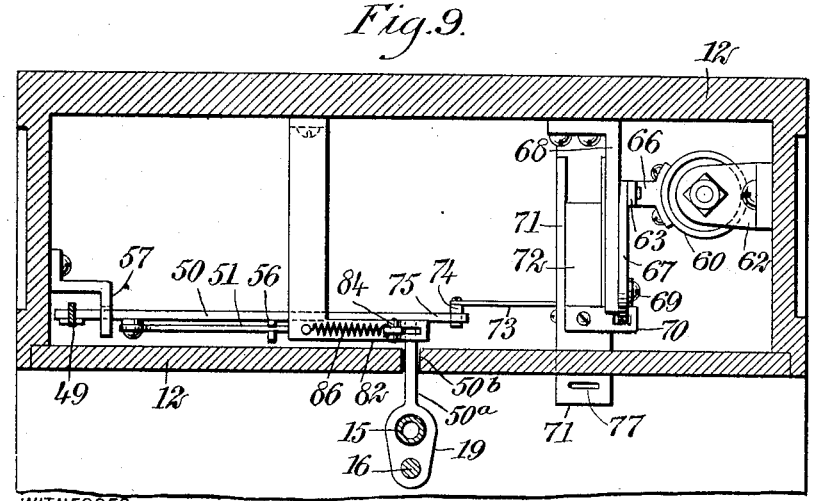

Figure 1 is a front elevation of the machine complete. Fig. 2 is a side elevation of the same. Fig. 3 is an enlarged vertical section through the upper portion of the machine viewed as from the front thereof. Fig. 4 is an enlarged fragmentary section of the lower portion of the machine viewed also as from the front thereof. Figs. 5 and 6 are detail elevations showing the locking mechanism for preventing the repeated use of the machine after the deposit of a single coin, certain movable parts being shown in different positions in these two figures. Fig. 7 is an enlarged vertical section through the upper portion of the machine viewed as from the right of Fig. 3. Fig. 8 is a somewhat similar view of the lower portion of the machine, forming virtually a continuation of Fig. 7. Fig. 9 is a horizontal cross-section through the machine upon the line 9 9 of Fig. 3 looking in the direction of the arrow. Fig. 10 is a vertical longitudinal section through the coin-receiving mechanism and is taken upon the line 10 10 of Fig. 11 looking in the direction of the arrow; and Fig. 11 is a vertical cross-section through the coin-receiving mechanism, taken upon the line 11 11 of Fig. 10 looking in the direction of the arrow.

The casing is shown at 12 and is provided with a base portion 14, and mounted within the same is a depressible platform 13.
Mounted upon a guide-rod 15 is a slide 16, provided with a head-plate 17 and with sliding shoes 18, 19, which travel directly upon the guide-rod. A dial 20 is inclosed within a facing 21 and mounted upon the upper end of the casing 12. Supporting the platform 13 is a bracket 22, connected by a pivot 23 with a link 26 and held in position by a screw 24. A pivot 25 connects the bracket 22 with a lever 27, this lever and the link 26 being fulcrumed upon a bracket 28 and constituting a so-called "parallel motion," whereby the platform 13 is rendered level at all times. A pair of lugs 29 carry a pin 30, which passes through a slot 31 in the lever 27, these lugs being rigidly connected with a large weight 32, which is engaged by slides 33 and adapted to move vertically. A rod 34 is mounted at 35 upon the weight 32 and adapted to be moved vertically thereby. A chain 36 connects the large weight 32 with a number of pendent weights 37, as indicated in Fig. 4, supported by a cord 38, which is partially wound upon a revoluble drum 39, the latter being supported upon a bearing 40 and provided with a spindle 42, carrying a pointer 43, movable angularly with the spindle 42 as a center. A disk 44 is provided with numbers 45, representing the weights of persons and so arranged as to pass successively into alinement with a slot 46, as indicated in Fig. 1. A drum 47, having substantially the form of a large pulley, is connected rigidly with the spindle 42, and partially wound upon this larger drum is a strap 49, which engages a groove 48 for the purpose, being secured within the groove by a fastening 48$^a$. The strap 49 supports a head 50, which carries a link 51, provided with a shoe 52. The head 50 is further provided with a neck 50$^a$, which projects through a vertical slot 50$^b$ in the casing 12 and is rigidly connected with the sliding shoe 19. By this means the motion of the head 50 is communicated through the front wall of the casing to the slide 16. The head 50 also carries a spring-pawl 53, adapted to engage the teeth 55 of a vertical rack-bar 54. A bracket 56, carried by the head 50, serves as a guide for the link 51. A guide-rod 57 is provided with a foot 58 and with a longitudinal slot 59, through which the head 50 passes, the head being guided thereby. The rod 34, which extends upwardly from the weight 32, is connected with a dash-pot 60, having a plunger 61, secured to a bracket 62, the plunger being thus rendered immovable. A pitman 63 is provided with a slot 64, through which passes a screw 65 into a lug 66, carried by the movable dash-pot 60. The pitman 63 is pivotally connected with a bell-crank lever 67, the latter being pivoted upon a bracket 68 by means of a pin 69 and free to rock within certain limits. The lower end of the bell-crank lever 67 passes through an eye 70, which is connected with a slide 72, mounted within a subcasing 71. A spring-arm 73 is provided with a lug 74 and is mounted upon a slide 76, so that the lug 74 may or may not, according to the position occupied by the slide 76, be in alinement with the boss 75, rigidly mounted upon the head 50. The subcasing 71 is provided with slots 77 80, the latter being comparatively small. The slide 72 is provided with a slot 78, adapted to register with the slot 77. A coin is shown at 79 and under normal conditions may be dropped through the slots 77 78, but is unable to pass through the slot 80. The purpose of this arrangement is to prevent the fraudulent use of knife-blades and thin pieces of metal instead of coins for operating the machines, the idea being that objects of the kind generally used for fraudulent means may pass readily through the slot 80, whereas a coin of proper denomination is obstructed, and thus retained, as indicated in Fig. 10. The subcasing 21 is further provided with a comparatively large slot 81. Two slotted brackets 82 83 are mounted rigidly within the casing 12 and disposed at the top and bottom of the rack-bar 54, which is provided with rollers 84 85, engaging these brackets. Springs 86 86$^a$ are connected with the respective top and bottom of the rack-bar and so tensioned as to normally draw the bar to the left, according to the view shown in Fig. 3. A roller 87 is connected with a gear-wheel 88 and is mounted upon a lever 89, controlled by the spring 90, the roller 87 thus engaging the drum 47. A resistance-fan 91 is turned by means of a pinion 92, which meshes with the gear-wheel 88.

The operation of my device is as follows: A person places a coin 79 in the slot 77 and mounts the platform 15. His weight raises the large weight 32, slackens the chain 36, and thus lightens the pendent weights 37. In case he mounts the platform without depositing the coin, however, the head 50 is unable to descend, as the boss 75 lodges upon the lug 74 of the spring-arm 73. (See Fig. 3.) The descent of the platform 13 always causes the upper slide 72 to travel inward; but unless it carries a coin 79 it is unable to move the lower slide. The coin 79 having been inserted, the slide 72 carries with it the slide 76, so that the coin 79 drops through the aperture 80. The inward movement of the lower slide carries the spring-arm 73 into such position that the lug 74 clears the boss 75. The head 50 now descends by its own weight and the strap 49 causes the drum 47 to rock, thus raising the weights 37. The rocking of the drum 47 is retarded by the action of the fan 91. The bracket 16 slowly descends until the head-plate 17 rests upon the head of the person standing upon the platform. The various heights being marked upon the dial 20, the needle 43 indicates the height of the person. The numbers 45 represent the normal weights of persons of different heights and are so arranged that the weight corresponding to a person's particular height is indicated by the registry of one of the numbers 45 with the slot 46, as shown in Fig. 1. The descent of the head 50 causes the shoe 52 to drag upon the rack-bar 54, as indicated in Fig. 5, the shoe being displaced and the spring-pawl 53 being clear of the teeth 55. The descent of the head 50 is limited by the strap 49. When, however, the person steps off the platform, thus releasing the large weight 32, the latter draws down the pendent weights 37 and tightens the cord 38, thereby rotating the drum 39 and restoring the several revoluble parts to their normal positions. The ascent of the head 50 brings the shoe 52 into firm engagement with the rack-bar 54, forcing the latter bodily to the right, as seen in Fig. 6, and causing the spring-pawl 53 to click against the teeth 55. The head 50 is thus free to ascend, but not to descend. This arrangement prevents repeated use of the machine upon the payment of a single coin by a number of persons successively stepping upon the platform without allowing the movable parts to resume their normal positions. No further use of the machine can be made until the head 50 travels to its upper limit, so that the shoe 52 clears the upper end of the rack-bar and the teeth 55 clear the spring-pawl 53, as indicated in Fig. 3. The dash-pot 60 prevents abrupt movement of the weights 32 and 37 and allays shocks to the platform 13 and to the person standing thereupon. The fan 91 similarly retards abrupt movements of the drums and parts connected therewith.

Having thus described my invention, I claim as new and desire to secure by Letters Patent—

1. The combination of a drum, a head movable in relation thereto, a strap connected with said head and partially wound upon said drum for the purpose of lowering and raising said head as said drum is rocked, mechanism controllable by the weight of a person for actuating said drum, a member connected with said head for descending into engagement with said person, and mechanism connected with said member for indicating the height of said person.

2. The combination of a movable member for determining measurements, a head connected with said movable member and adapted to move therewith, a rack disposed adjacent to said head, a pawl mounted upon said head and adapted to engage said rack, so as to prevent further movement of said head relatively thereto, and mechanism connected with said head and controllable by the movement of a person for causing said pawl to engage said rack.

3. The combination of a movable member for engaging the head of a person whose height is to be measured, a head connected with said movable member and adapted to move in accordance with movements of the same, a rack disposed adjacent to said head, a pawl connected with said head and normally disengaged from said rack, mechanism controllable by the weight of a person for moving said head in a predetermined direction relatively to said rack, and means for forcing said pawl into engagement with said rack so as to prevent further movement of said head in the same direction relatively to said rack.

In testimony whereof I have signed my name to this specification in the presence of two subscribing witnesses.

STEPHEN OSCAR MYERS.

Witnesses:
    JOHN HAROLD TALLMAN,
    WM. F. GREENE.